(12) United States Patent
Yamamura et al.

(10) Patent No.: US 10,759,131 B2
(45) Date of Patent: Sep. 1, 2020

(54) METHOD OF BUILDING TIRE AND TIRE BUILDING MACHINE

(71) Applicant: The Yokohama Rubber Co., LTD., Minato-ku, Tokyo (JP)

(72) Inventors: Eiji Yamamura, West Point, MS (US); Tomohiro Kumazawa, West Point, MS (US)

(73) Assignee: The Yokohama Rubber Co., LTD. (JP)

( * ) Notice: Subject to any disclaimer, the term of this patent is extended or adjusted under 35 U.S.C. 154(b) by 223 days.

(21) Appl. No.: 15/795,146

(22) Filed: Oct. 26, 2017

(65) Prior Publication Data

US 2018/0339476 A1 Nov. 29, 2018

Related U.S. Application Data

(60) Provisional application No. 62/511,877, filed on May 26, 2017.

(51) Int. Cl.
*B29D 30/26* (2006.01)
*B29D 30/30* (2006.01)
*B29D 30/28* (2006.01)

(52) U.S. Cl.
CPC ......... *B29D 30/2607* (2013.01); *B29D 30/28* (2013.01); *B29D 30/3007* (2013.01)

(58) Field of Classification Search
CPC ............ B29D 30/3007; B29D 30/3042; B29D 30/42; B29D 2030/3092; B29D 2030/421; B29D 30/246
USPC .......................................................... 156/134
See application file for complete search history.

(56) References Cited

U.S. PATENT DOCUMENTS

| 3,813,271 A | * | 5/1974 | Riggs | B29D 30/242 156/417 |
| 4,769,104 A | * | 9/1988 | Okuyama | B29D 30/3007 156/406.4 |
| 7,866,359 B2 | * | 1/2011 | de Laubier | B29D 30/246 156/117 |
| 2018/0126660 A1 | * | 5/2018 | Grolleman | B29O 66/49 |

FOREIGN PATENT DOCUMENTS

JP 2011-240691 12/2011

* cited by examiner

*Primary Examiner* — Robert C Dye
*Assistant Examiner* — Alexander D Booth
(74) *Attorney, Agent, or Firm* — Thorpe North & Western

(57) ABSTRACT

The present technology provides a method of building a tire and a tire building machine. When bonding together longitudinal direction end portions of an outer circumferential side strip-shaped rubber member wrapped around a building drum to form a cylindrical shape, inner circumferential surfaces of projecting parts of the longitudinal direction end portions that project in a drum width direction relative to an inner circumferential side strip-shaped rubber member are supported by a support section, and the inner circumferential surfaces are positioned at a level of an outer circumferential surface of the inner circumferential side strip-shaped rubber member. In this state, the projecting parts are pressed in the drum width direction by a pressing section, and the longitudinal direction end portions are bonded together.

6 Claims, 18 Drawing Sheets

METHOD OF BUILDING TIRE AND TIRE BUILDING MACHINE

RELATED APPLICATION

This application claims the benefit of U.S. Provisional Application No. 62/511,877, filed May 26, 2017.

TECHNICAL FIELD

The present technology relates to a method of building a tire and a tire building machine. More particularly, the present technology relates to a method of building a tire and a tire building machine that, when an outer circumferential side strip-shaped rubber member wrapped around an relatively outer circumferential side of a building drum is layered on an inner circumferential side strip-shaped rubber member wrapped around an relatively inner circumferential side of the building drum such that the outer circumferential side strip-shaped rubber member projects in a drum width direction, and longitudinal direction end portions of the outer circumferential side strip-shaped rubber member are bonded together to form a cylindrical shape, can suppress skew in the bonding position and enable the longitudinal direction end portions to be strongly bonded together.

BACKGROUND ART

When producing a tire, various strip-shaped rubber members are wrapped around a building drum to build a green tire, and the green tire is then vulcanized to complete the tire. In the process for building the green tire, for example, an innerliner member is wrapped around the building drum into a cylindrical shape. Then, rubber chafer members are layered on both sides of the innerliner member in the width direction and wrapped into a cylindrical shape (see Japanese Unexamined Patent Application Publication No. 2011-240691A, paragraph 0016, FIG. 3, and the like).

When layering a member such as a rubber chafer member on an innerliner member already wrapped on a building drum with the rubber chafer member projecting in the drum width direction, and then bonding longitudinal direction end surfaces of the members to each other, it is easy for the bonding position to become skewed, and difficult to bond the members strongly. This is because at the projecting parts of the rubber chafer member that project from the innerliner member in the drum width direction, there is a gap between the inner circumferential surfaces of the projecting parts and the outer circumferential surface of the building drum. This results in the projecting parts being in a floating state. In other words, there is nothing supporting the inner circumferential surfaces of the projecting parts, and thus the projecting parts deform due to gravitational force. Thus, when bonding the longitudinal direction end portions of the rubber chafer member together, it is necessary to correct skew between the projecting parts. However, because the projecting parts are in a floating state, it is difficult to strongly bond those parts without the bonding position becoming skewed.

SUMMARY

The present technology provides a method of building a tire and a tire building machine that, when an outer circumferential side strip-shaped rubber member wrapped around an relatively outer circumferential side of a building drum is layered on an inner circumferential side strip-shaped rubber member wrapped around an relatively inner circumferential side of the building drum such that the outer circumferential side strip-shaped rubber member projects in a drum width direction, and longitudinal direction end portions of the outer circumferential side strip-shaped rubber member are bonded together to form a cylindrical shape, can suppress skew in the bonding position and enable the longitudinal direction end portions to be strongly bonded together.

A method of building a tire of the present technology is a method of building a tire in which, when layering and wrapping a plurality of strip-shaped rubber members around a building drum to form a cylindrical shape, an outer circumferential side strip-shaped rubber member wrapped around an relatively outer circumferential side of the building drum is layered on an inner circumferential side strip-shaped rubber member wrapped around an relatively inner circumferential side of the building drum such that the outer circumferential side strip-shaped rubber member projects in a drum width direction, and longitudinal direction end portions of the outer circumferential side strip-shaped rubber member that are inclined relative to the drum width direction when viewed in a front view are bonded together. The method includes, when bonding the longitudinal direction end portions together, supporting inner circumferential surfaces of the longitudinal direction end portions projecting relative to the inner circumferential side strip-shaped rubber member in the drum width direction, positioning the inner circumferential surfaces at a level of an outer circumferential surface of the inner circumferential side strip-shaped rubber member, and pressing the projecting parts in the drum width direction to bond the longitudinal direction end portions together.

A tire building machine according to the present technology is a tire building machine, including a member feeding section that feeds a strip-shaped rubber member and a building drum on which a plurality of the strip-shaped rubber members fed by the member feeding section are layered and wrapped to form a cylindrical shape, configured such that an outer circumferential side strip-shaped rubber member wrapped around an relatively outer circumferential side of the building drum is layered on an inner circumferential side strip-shaped rubber member wrapped around an relatively inner circumferential side of the building drum such that the outer circumferential side strip-shaped rubber member projects in a drum width direction, and longitudinal direction end portions of the outer circumferential side strip-shaped rubber member that are inclined relative to the drum width direction when viewed in a front view are bonded together. The device includes a support section that supports inner circumferential surfaces of projecting parts of the longitudinal direction end portions that project relative to the inner circumferential side strip-shaped rubber member in the drum width direction such that the inner circumferential surfaces are positioned at a level of an outer circumferential surface of the inner circumferential side strip-shaped rubber member; and a pressing section that presses, in the drum width direction, the projecting parts that are positioned and bonds the longitudinal direction end portions together.

According to the present technology, the inner circumferential surfaces of the projecting parts at the longitudinal direction end portions of the outer circumferential side strip-shaped rubber member, that project in the drum width direction relative to the inner circumferential side strip-shaped rubber member and are in a floating state, are supported so as to be positioned at the level of the outer circumferential surface of the inner circumferential side strip-shaped rubber member. As such, the longitudinal direction end portions to be bonded together can be caused to oppose each other in the drum width direction precisely at a predetermined position. By then pressing the projecting parts in the drum width direction while in this state, the longitudinal direction end portions can be strongly bonded together while suppressing skew in the bonding positions of the longitudinal direction end portions.

DETAILED DESCRIPTION

A method of building a tire and a tire building machine of the present technology will be described on the basis of the embodiments illustrated in the diagrams as follows.

Figure 1:
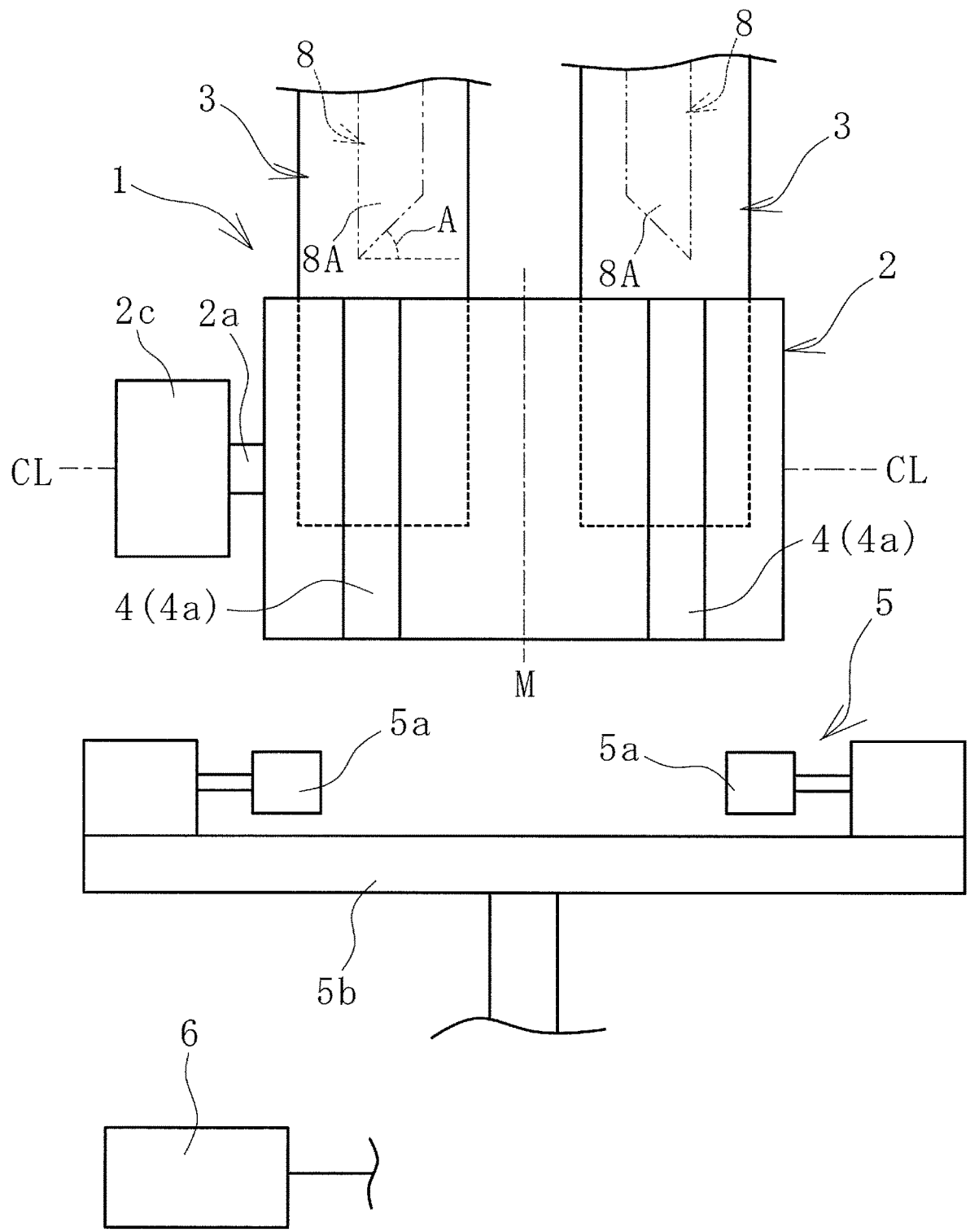
FIG. 1 is an explanatory diagram illustrating a tire building machine according to the present technology in a plan view.
Figure 2:
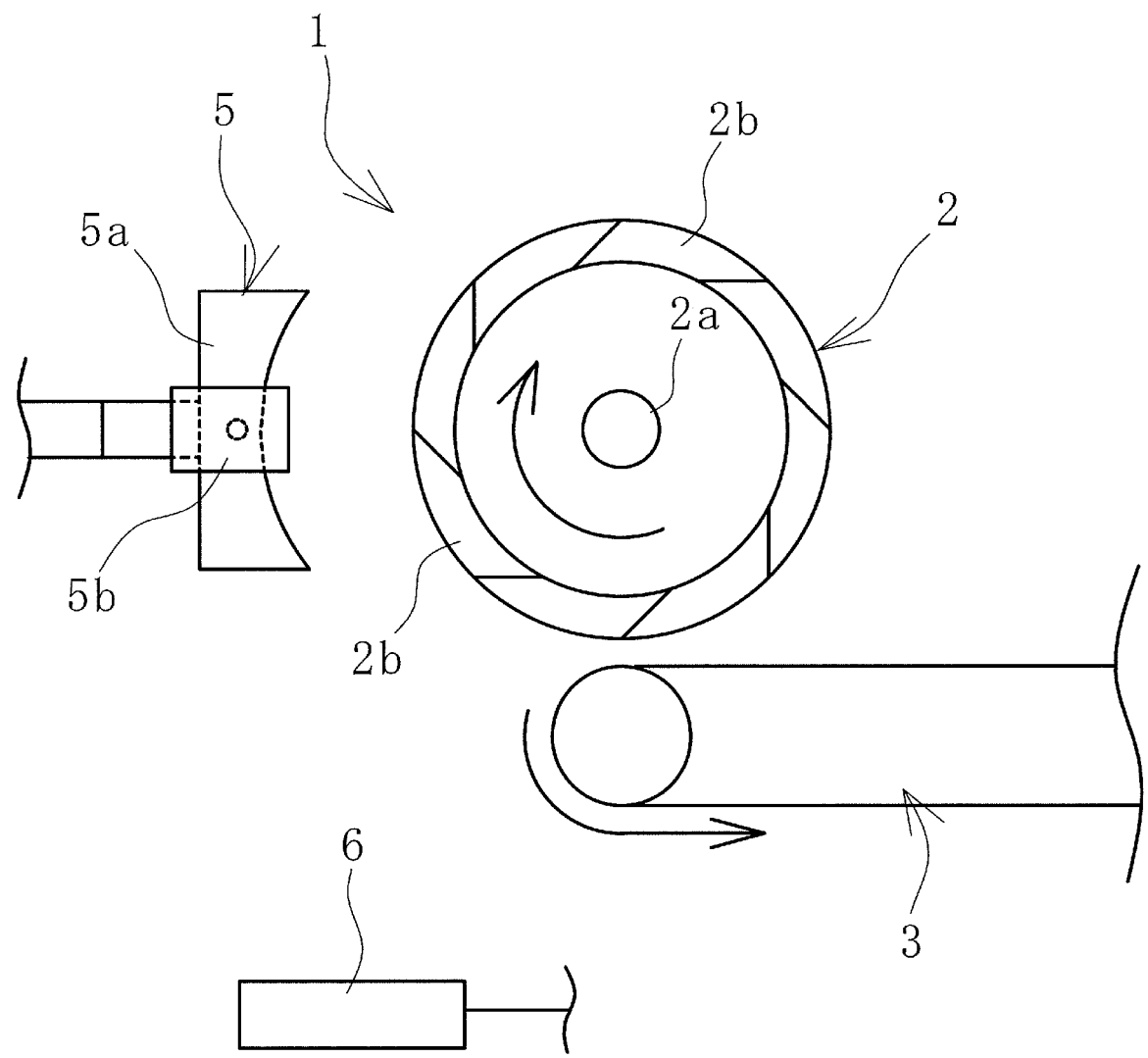
FIG. 2 is an explanatory diagram illustrating the building machine of FIG. 1 in a side view.
Figure 3:
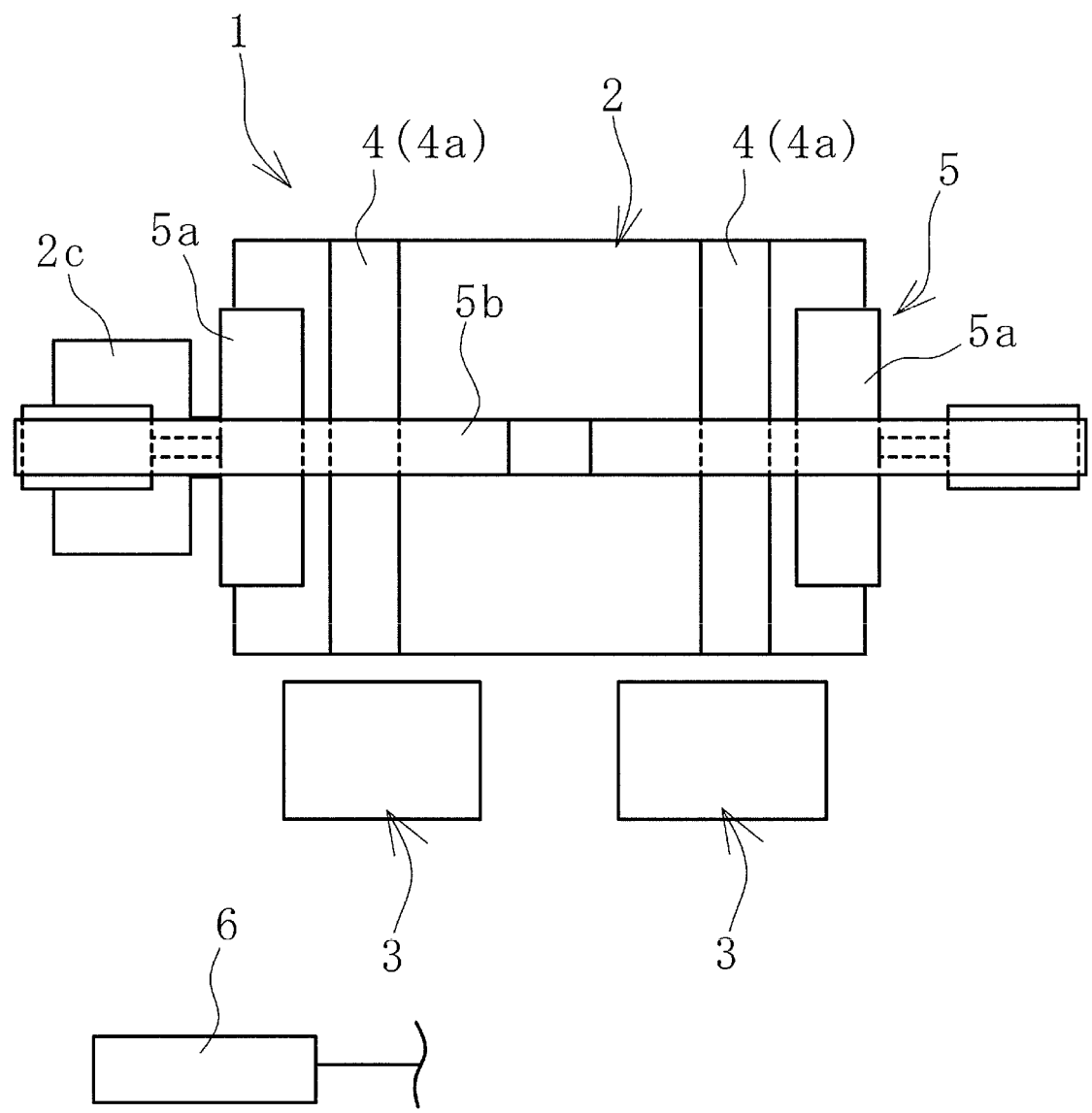
FIG. 3 is an explanatory diagram illustrating the building machine of FIG. 1 in a front view.

A tire building machine 1 according to the present technology, illustrated in FIGS. 1 to 10, is used when forming strip-shaped rubber members into a cylindrical shape. As will be described below, an inner circumferential side strip-shaped rubber member 7 and outer circumferential side strip-shaped rubber members 8 are used as the strip-shaped rubber members. The strip-shaped rubber members 7 and 8 may be constituted of unvulcanized rubber, or may be constituted of unvulcanized rubber and reinforcing wire or the like. In the drawings, a dot-dash line CL indicates a center axis of a building drum 2, and a dot-dash line M indicates a center of the building drum 2 in a width direction thereof. In FIG. 1, the outer circumferential side strip-shaped rubber members 8 are indicated by double-dot-dash lines.

Figure 10:
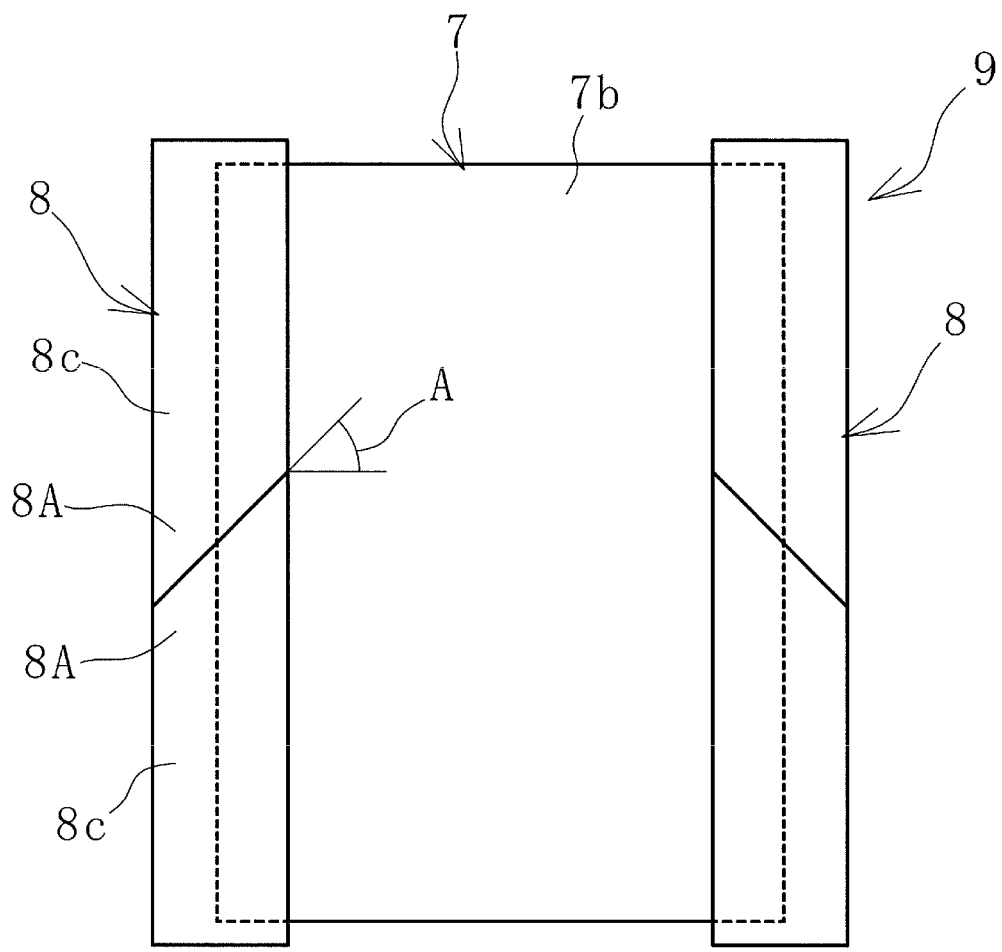
FIG. 10 is an explanatory diagram illustrating a state in which longitudinal direction end portions of the outer circumferential side strip-shaped rubber members of FIG. 9 are bonded together to form a cylindrical shape, in a front view.

According to the present technology, a cylindrical body 9 is built by forming the inner circumferential side strip-shaped rubber member 7 and the outer circumferential side strip-shaped rubber members 8 into a cylindrical shape, as illustrated in FIG. 10. The cylindrical body 9 is used as a constituent member of a green tire, and a pneumatic tire is produced by vulcanizing the green tire.

In the cylindrical body 9, the outer circumferential side strip-shaped rubber members 8 are layered on an outer circumferential surface 7b of the cylindrical inner circumferential side strip-shaped rubber member 7 to form a cylindrical shape. Note that the inner circumferential side strip-shaped rubber member 7 is also formed in a cylindrical shape with longitudinal direction end portions thereof bonded together. Longitudinal direction end portions 8A of the outer circumferential side strip-shaped rubber members 8 are cut to a predetermined inclination angle A relative to a width direction (a direction orthogonal to the longitudinal direction of the outer circumferential side strip-shaped rubber members 8) when viewed in a front view. The longitudinal direction end portions 8A cut to an angle are bonded together. The inclination angle A is greater than or equal to 30° and less than or equal to 60°, for example.

The outer circumferential side strip-shaped rubber members 8 are disposed on both end portions in the width direction of the inner circumferential side strip-shaped rubber member 7, with each having a projecting part 8c projecting in the width direction with respect to the inner circumferential side strip-shaped rubber member 7. The outer circumferential surface 7b of the inner circumferential side strip-shaped rubber member 7 and inner circumferential surfaces 8a of the outer circumferential side strip-shaped rubber members 8 are partially bonded to each other. The projecting parts 8c, however, are not bonded, and are thus in a floating state.

The building machine 1 includes the building drum 2, member feeding sections 3 that feed the strip-shaped rubber members 7 and 8 to the building drum 2, a support section 4 and a pressing section 5 used when bonding the longitudinal direction end portions 8A of the outer circumferential side strip-shaped rubber members 8 together, and a control unit 6. The member feeding section 3 that feeds the inner circumferential side strip-shaped rubber member 7 is not illustrated in FIGS. 1 to 3. The control unit 6 controls the movement of at least the building drum 2, the support section 4, and the pressing section 5. A configuration in which the movement of the member feeding sections 3 is controlled by the control unit 6 is also possible.

The building drum 2 can be rotated by a drive motor 2c central to a support shaft 2a, and has a plurality of segments 2b. The building drum 2 contracts in diameter by the segments 2b moving inward in a drum radial direction, and expands in diameter by the segments 2b moving outward in the drum radial direction.

A conveyor belt is used as the member feeding section 3, for example. In this embodiment, the member feeding sections 3 are capable of extending toward and retracting from below the building drum 2. The inner circumferential side strip-shaped rubber member 7 and the outer circumferential side strip-shaped rubber members 8 may be fed by different member feeding sections 3, or by the same member feeding section 3. The form, arrangement, number, and the like of the member feeding sections 3 can be determined as desired. In the case where the member feeding section 3 that feeds the inner circumferential side strip-shaped rubber member 7 and the member feeding sections 3 that feed the outer circumferential side strip-shaped rubber members 8 are arranged in different positions, the building drum 2 is capable of moving to the positions of the member feeding sections 3, for example.

The support section 4 supports the inner circumferential surfaces 8a of the projecting parts 8c of the outer circumferential side strip-shaped rubber members 8 wrapped around the building drum 2. The support section 4 according to this embodiment has protrusion members 4a provided so as to be movable outward in the drum radial direction, relative to the outer circumferential surface of the building drum 2. By providing the protrusion members 4a around the entire circumference of the building drum 2 or in some of the segments 2b, a configuration in which the inner circumferential surfaces 8a of the projecting parts 8c of the longitudinal direction end portions 8A are supported can be achieved.

The pressing section 5 presses the projecting parts 8c, the inner circumferential surfaces 8a of which are supported by the support section 4, in the drum width direction. The pressing section 5 according to this embodiment includes arc-shaped members 5a having arc-shaped curved surfaces on inner circumferences thereof when viewed in a side view, and a frame 5b that holds the arc-shaped members 5a. The arc-shaped members 5a can be positioned in desired positions by moving the frame 5b. The arc-shaped members 5a are moved in the drum width direction of the building drum 2 by a fluid cylinder, for example.

Next, an example of the steps in a method of building a tire according to the present technology will be described.

First, the inner circumferential side strip-shaped rubber member 7 is wrapped around the building drum 2, and the longitudinal direction end portions thereof are bonded together to form a cylindrical shape. An inner circumferential surface 7a of the inner circumferential side strip-shaped rubber member 7 is in contact with the outer circumferential surface of the building drum 2.

Figure 4:
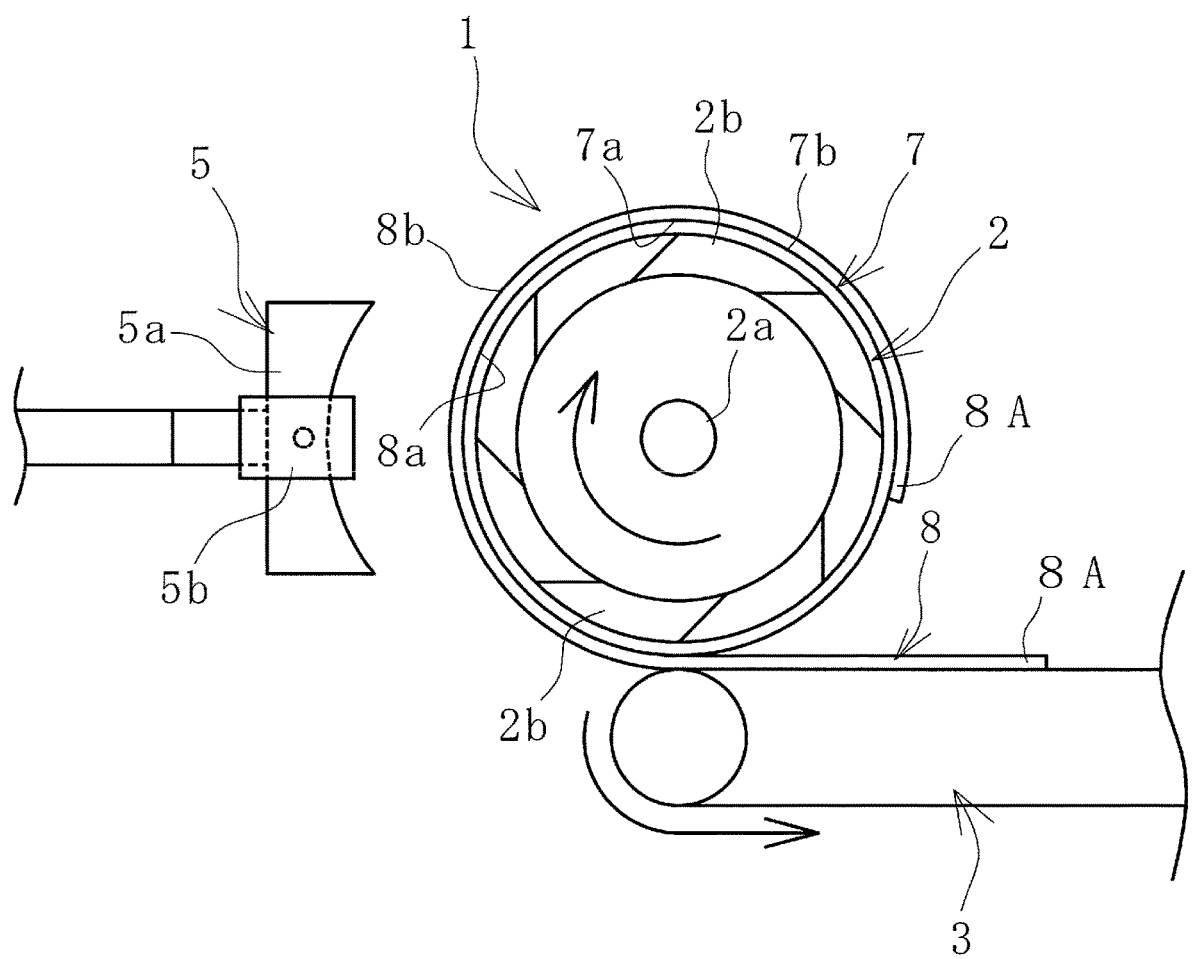
FIG. 4 is an explanatory diagram illustrating, in a side view, a state in which an outer circumferential side strip-shaped rubber member is wrapped around a building drum.

Next, as illustrated in FIG. 4, the building drum 2 is rotated while conveying the outer circumferential side strip-shaped rubber members 8 toward the building drum 2 using the member feeding sections 3. The outer circumferential side strip-shaped rubber members 8 fed to the building drum 2 are wrapped while layered on the outer circumferential surface 7b of the cylindrical inner circumferential side strip-shaped rubber member 7. The outer circumferential side strip-shaped rubber members 8 are pre-cut to an appropriate length at which the longitudinal direction end portions 8A can be bonded on the building drum 2 without any excess or deficiency. Likewise, the inner circumferential side strip-shaped rubber member 7 is fed to the building drum 2 having been cut to an appropriate length.

The following will describe the outer circumferential side strip-shaped rubber member 8 layered on the left side of the inner circumferential side strip-shaped rubber member 7 in the drum width direction. However, the same steps are used to form the outer circumferential side strip-shaped rubber member 8 on the right side in the drum width direction into a cylindrical shape as well. It is preferable that the outer circumferential side strip-shaped rubber members 8 layered on the left side and the right side be formed into a cylindrical shape at the same time.

Figure 5:
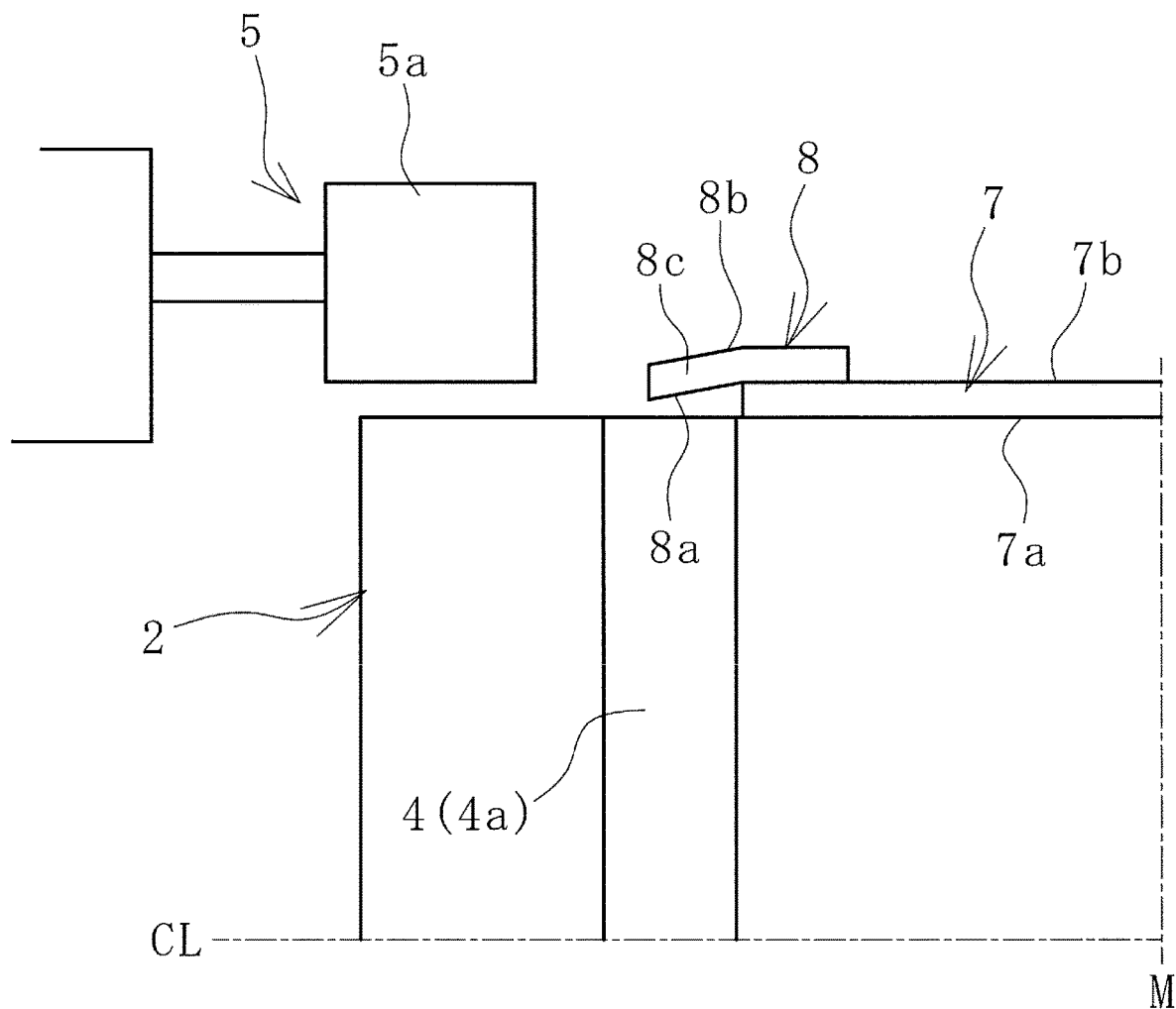
FIG. 5 is an explanatory diagram illustrating, in a side cross-sectional view, the wrapped outer circumferential side strip-shaped rubber member layered on the outer circumferential surface of an inner circumferential side strip-shaped rubber member, in an enlarged manner.

As illustrated in FIG. 5, the outer circumferential side strip-shaped rubber member 8 is layered so as to project in the drum width direction relative to the inner circumferential side strip-shaped rubber member 7 wrapped around the building drum 2. Part of the inner circumferential surface 8a of the outer circumferential side strip-shaped rubber member 8 is bonded to the outer circumferential surface 7b of the inner circumferential side strip-shaped rubber member 7, and an outer circumferential surface 8b is exposed on an outer circumferential surface.

Figure 6:
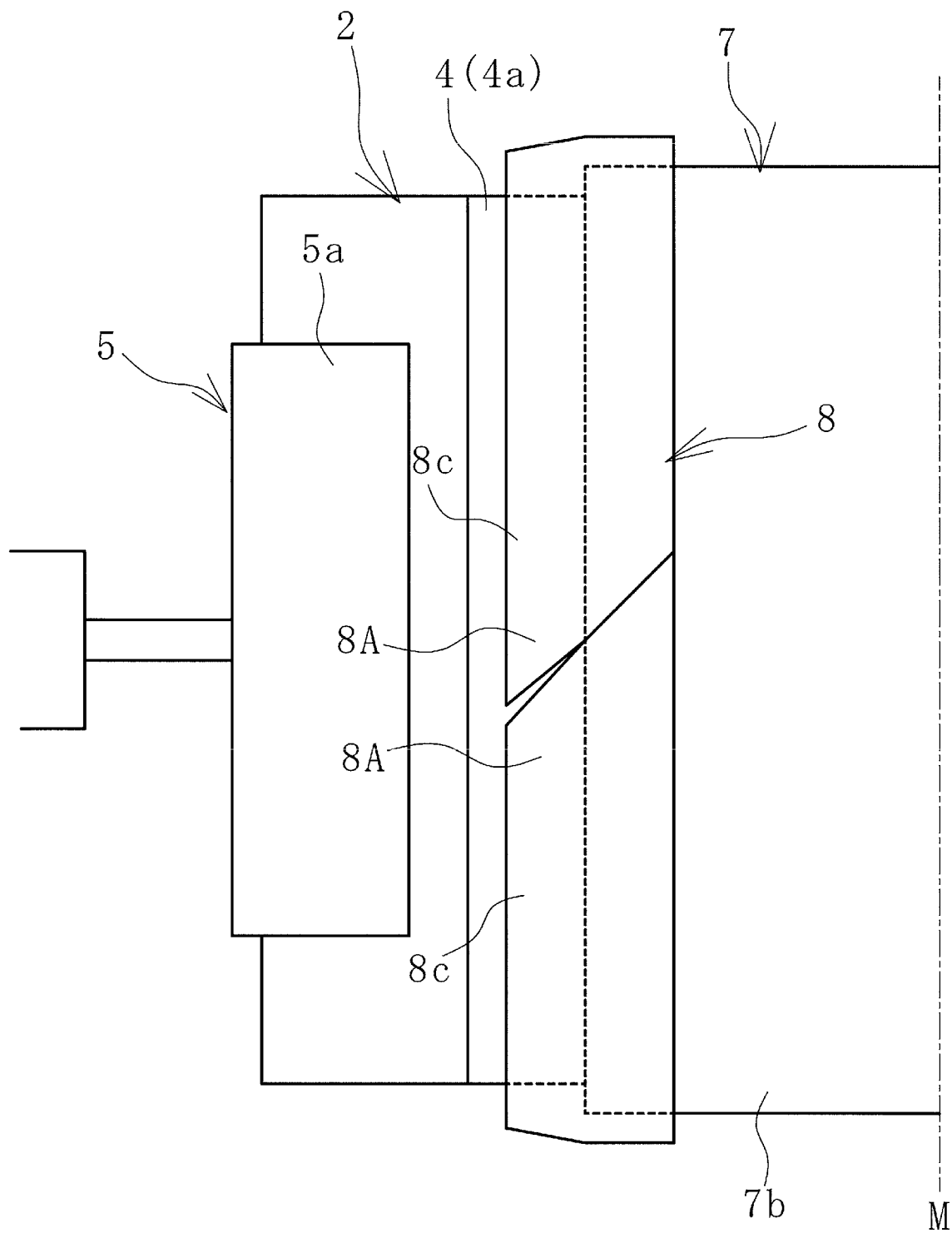
FIG. 6 is an explanatory diagram illustrating a longitudinal direction end portion of the outer circumferential side strip-shaped rubber member of FIG. 5, in a front view.

Upon the entire circumference of the outer circumferential side strip-shaped rubber member 8 being wrapped around the building drum 2, the longitudinal direction end portions 8A are bonded together above the outer circumferential surface 7b of the inner circumferential side strip-shaped rubber member 7 with substantially no gap, as illustrated in FIG. 6. However, the projecting parts 8c of the longitudinal direction end portions 8A are in a floating state, and thus deform under their own weight. Thus, there are cases where the projecting parts 8c of the longitudinal direction end portions 8A are not bonded, with a gap arising therebetween.

Figure 7:
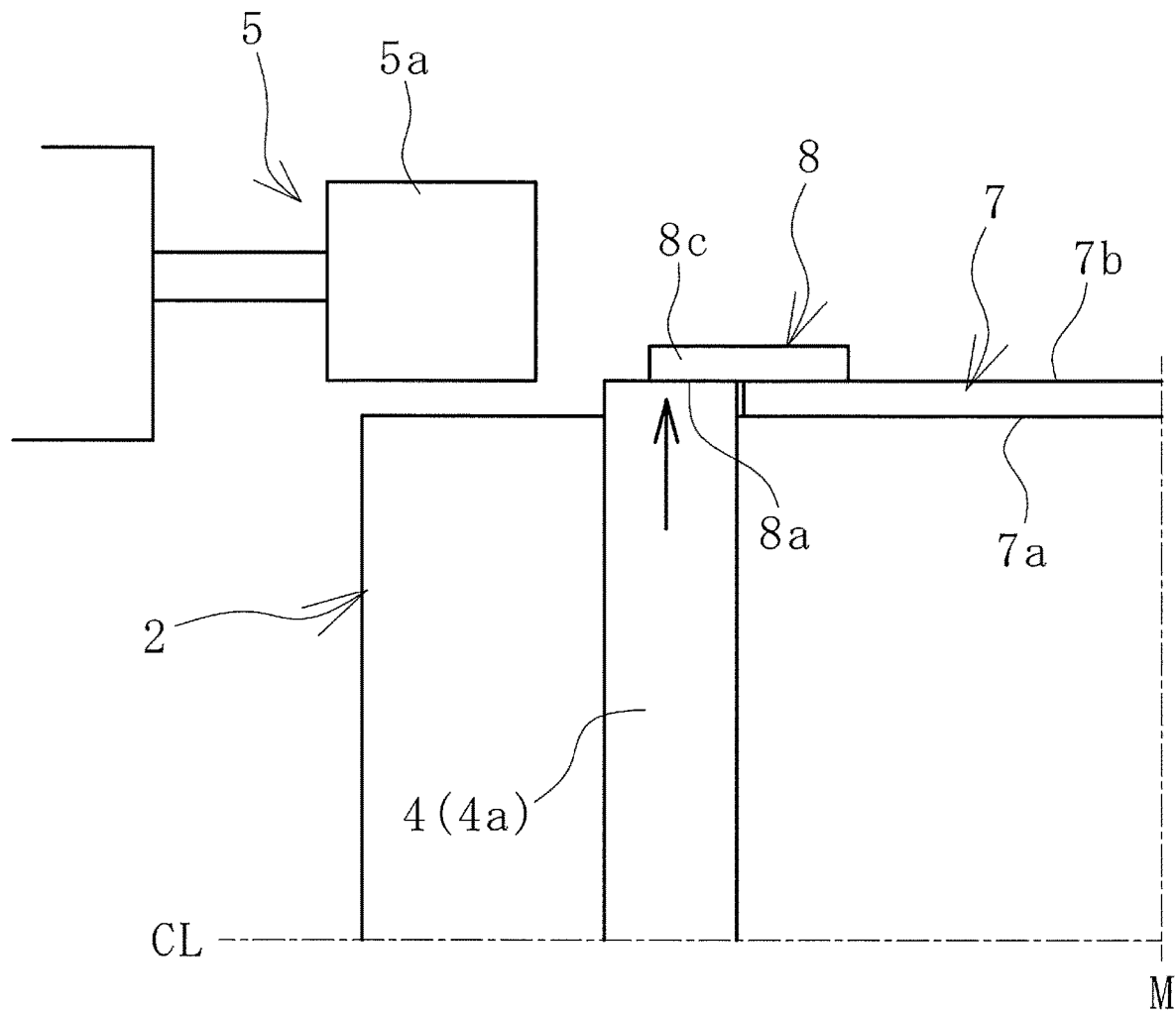
FIG. 7 is an explanatory diagram illustrating, in a side cross-sectional view, the inner circumferential surface of a projecting part of the longitudinal direction end portion of the outer circumferential side strip-shaped rubber member of FIG. 5, in a state where the inner circumferential surface is supported by a support portion.

Accordingly, in the present technology, the support section 4 (the protrusion member 4a) is caused to protrude outward from the outer circumferential surface of the building drum 2 in the drum radial direction, as illustrated in FIG. 7. The inner circumferential surfaces 8a of the projecting parts 8c of the longitudinal direction end portions 8A are supported by the protruding protrusion member 4a. The inner circumferential surfaces 8a are pushed upward by the protrusion member 4a to the same level as the outer circumferential surface 7b of the inner circumferential side strip-shaped rubber member 7, and are positioned at that level.

Figure 8:
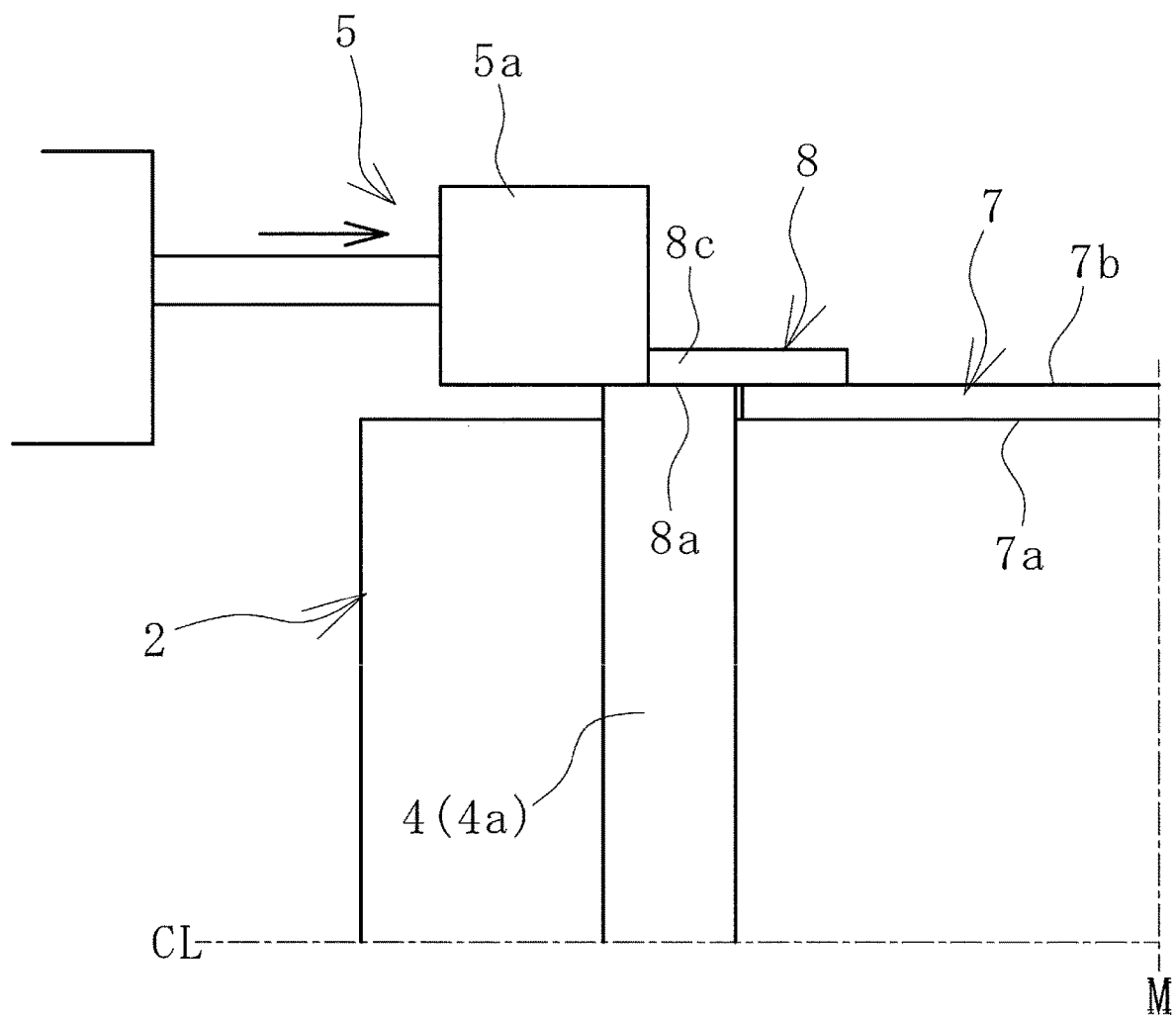
FIG. 8 is an explanatory diagram illustrating, in a side cross-sectional view, a state in which the projecting part of FIG. 7 is pressed in a drum width direction by a pressing portion.
Figure 9:
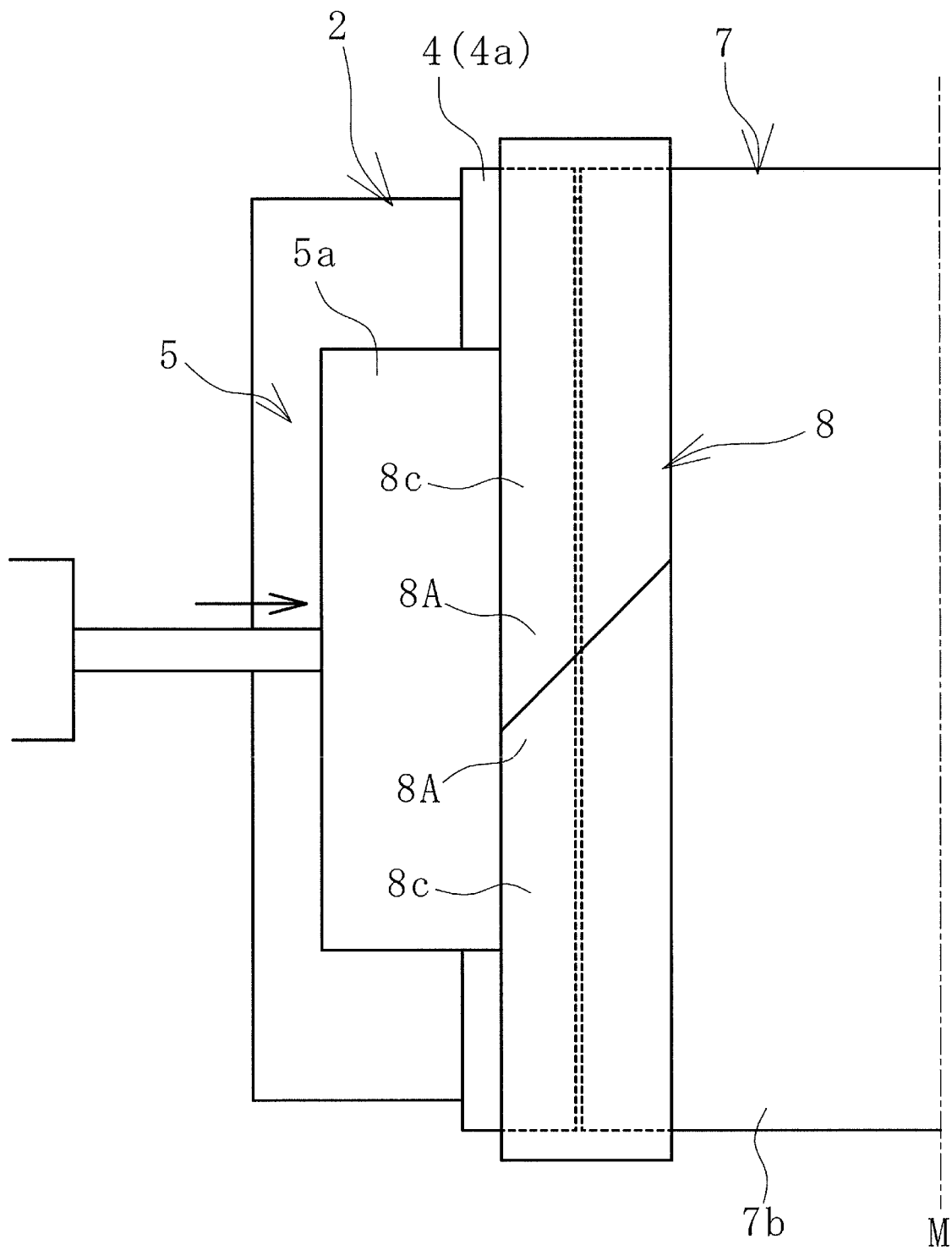
FIG. 9 is an explanatory diagram illustrating the state of FIG. 8 in a front view.

Next, as illustrated in FIGS. 8 and 9, the arc-shaped member 5a is moved toward the center in the drum width direction, and the arc-shaped member 5a is positioned spanning the boundary between the longitudinal direction end portions 8A. The projecting parts 8c are thus pressed toward the center in the drum width direction. As a result, the projecting parts 8c of the longitudinal direction end portions 8A, between which a gap had been present, are bonded together without a gap, and the longitudinal direction end portions 8A are bonded together across the entire ranges thereof A radius of curvature of the inner circumferential surface of the arc-shaped member 5a is set to be identical to or slightly greater than a radius of curvature of the outer circumferential surface of the protruding protrusion member 4a. As such, the arc-shaped member 5a can be moved smoothly in the drum width direction along the protrusion member 4a.

According to the present technology as described thus far, the inner circumferential surfaces 8a of the projecting parts 8c that are floating above the building drum 2 are supported by the support section 4, and thus deformation of the projecting parts 8c caused by their own weight is corrected. The inner circumferential surfaces 8a are positioned at the level of the outer circumferential surface 7b of the inner circumferential side strip-shaped rubber member 7, and thus the longitudinal direction end portions 8A to be bonded together can be caused to oppose each other in the drum width direction precisely at a predetermined position. By pressing the projecting parts 8c in the drum width direction while in this opposing state, the longitudinal direction end portions 8A can be strongly bonded together while suppressing skew in the bonding positions of the longitudinal direction end portions 8A.

A green tire is built by bonding other tire components to the cylindrical body 9 built in this manner. The cylindrical body 9 is illustrated in FIG. 10. Note that the cylindrical body 9 is detached from the building drum 2 by causing the building drum 2 to contract in diameter.

Figure 11:
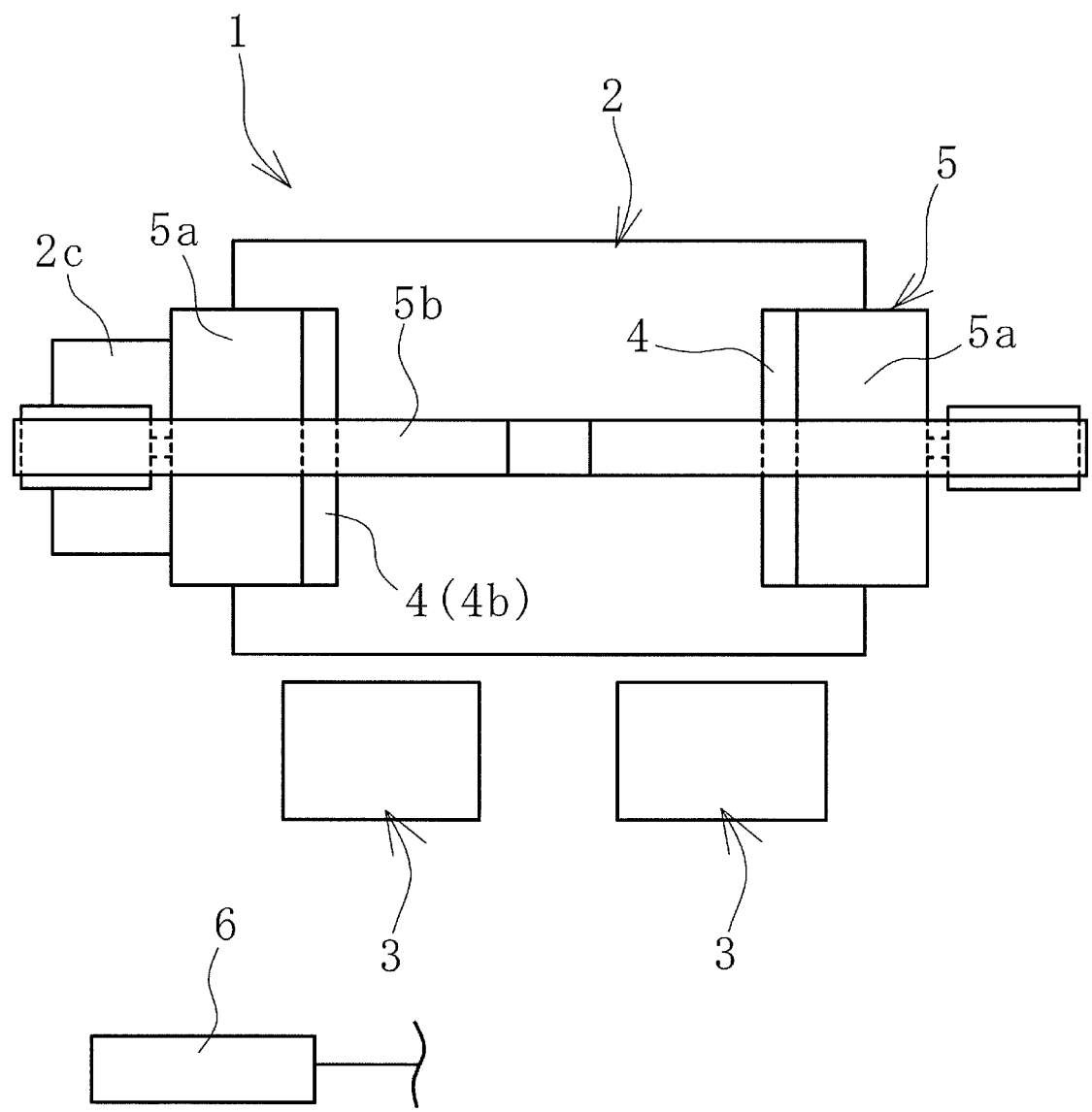
FIG. 11 is an explanatory drawing illustrating a building machine according to another embodiment, in a front view.
Figure 12:
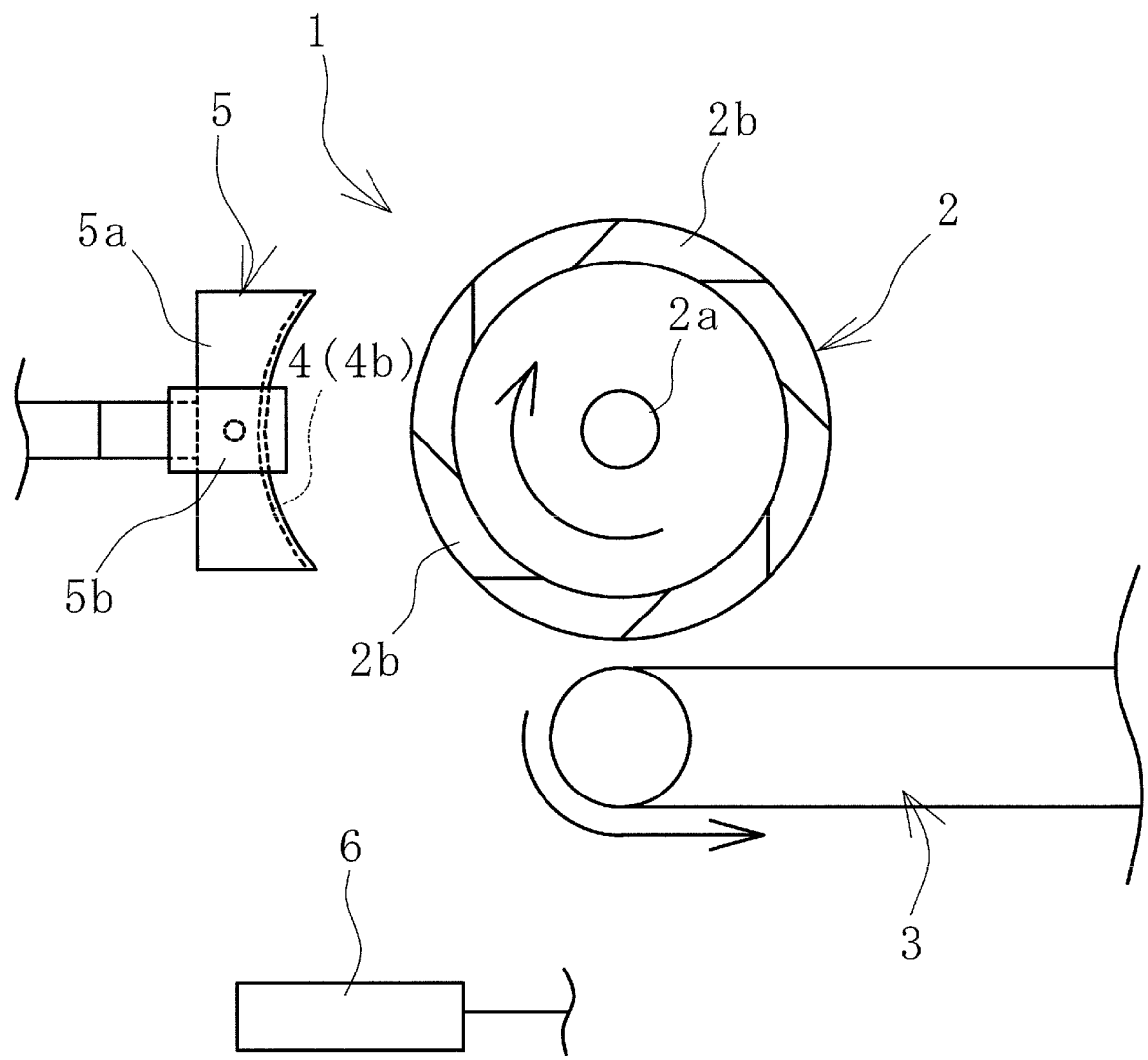
FIG. 12 is an explanatory diagram illustrating the building machine of FIG. 11 in a side view.

An embodiment of the building machine 1 illustrated in FIGS. 11 and 12 differs from the foregoing embodiment in terms of the support section 4 and the pressing section 5. Other configurations are substantially identical.

The support section 4 according to this embodiment includes arc-shaped members 4b having arc-shaped curved surfaces on inner circumferences thereof when viewed in a side view. The arc-shaped members 4b move in the drum width direction so as to enter into and exit from the gaps between the outer circumferential surface of the building drum 2 and the inner circumferential surfaces 8a of the projecting parts 8c. A radius of curvature of the arc-shaped members 4b is substantially identical to the radius of curvature of the arc-shaped members 5a. The pressing section 5 is integrally connected to one side of the support section 4 in the drum width direction. In other words, the support section 4 and the pressing section 5 have an integrated structure.

An example of the steps in a method of building a tire using this building machine 1 will be described.

Figure 13:
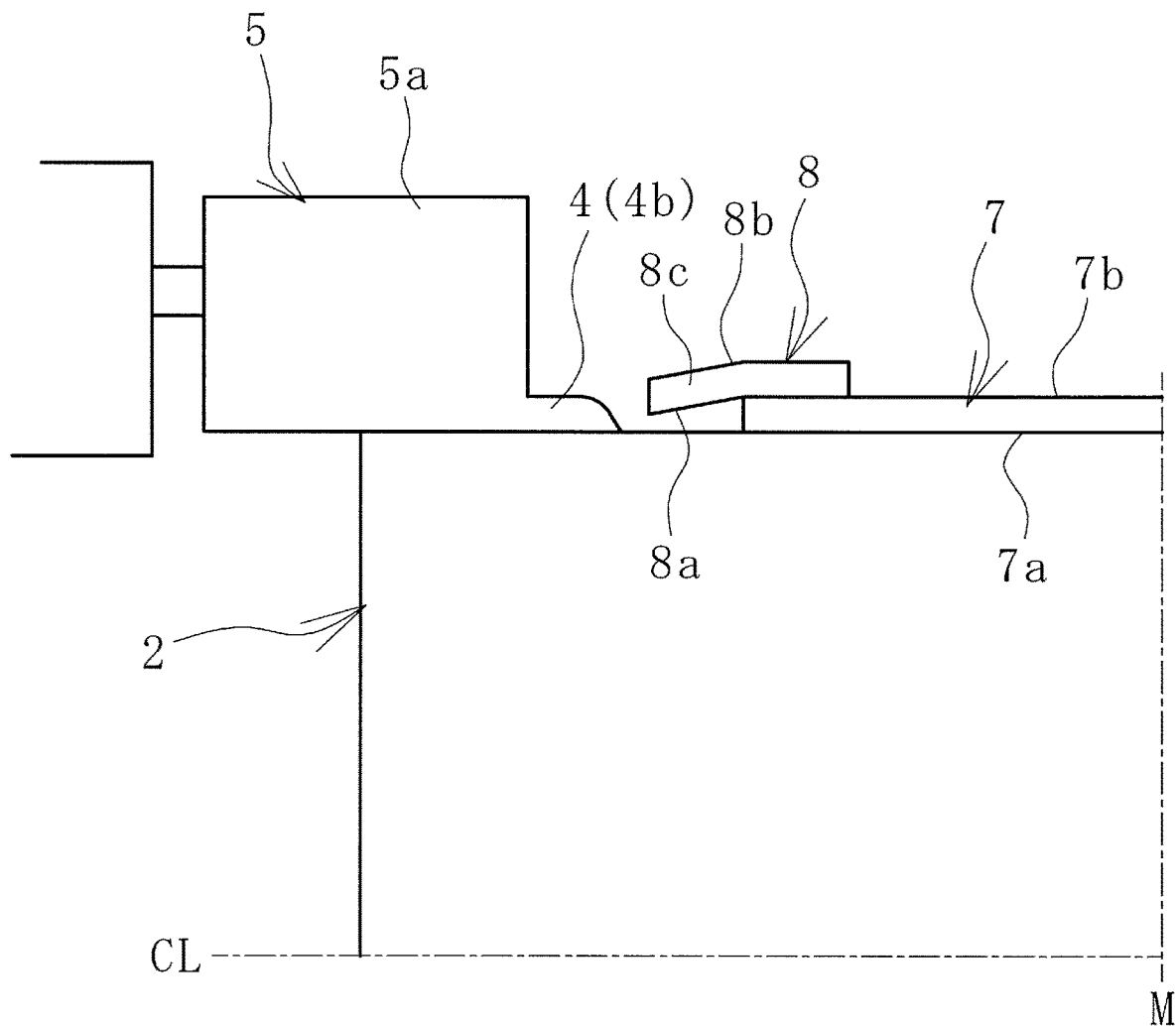
FIG. 13 is an explanatory diagram illustrating, in a side cross-sectional view, part of the wrapped outer circumferential side strip-shaped rubber member layered with the outer circumferential surface of an inner circumferential side strip-shaped rubber member on a building drum of FIG. 11, in an enlarged manner.
Figure 14:
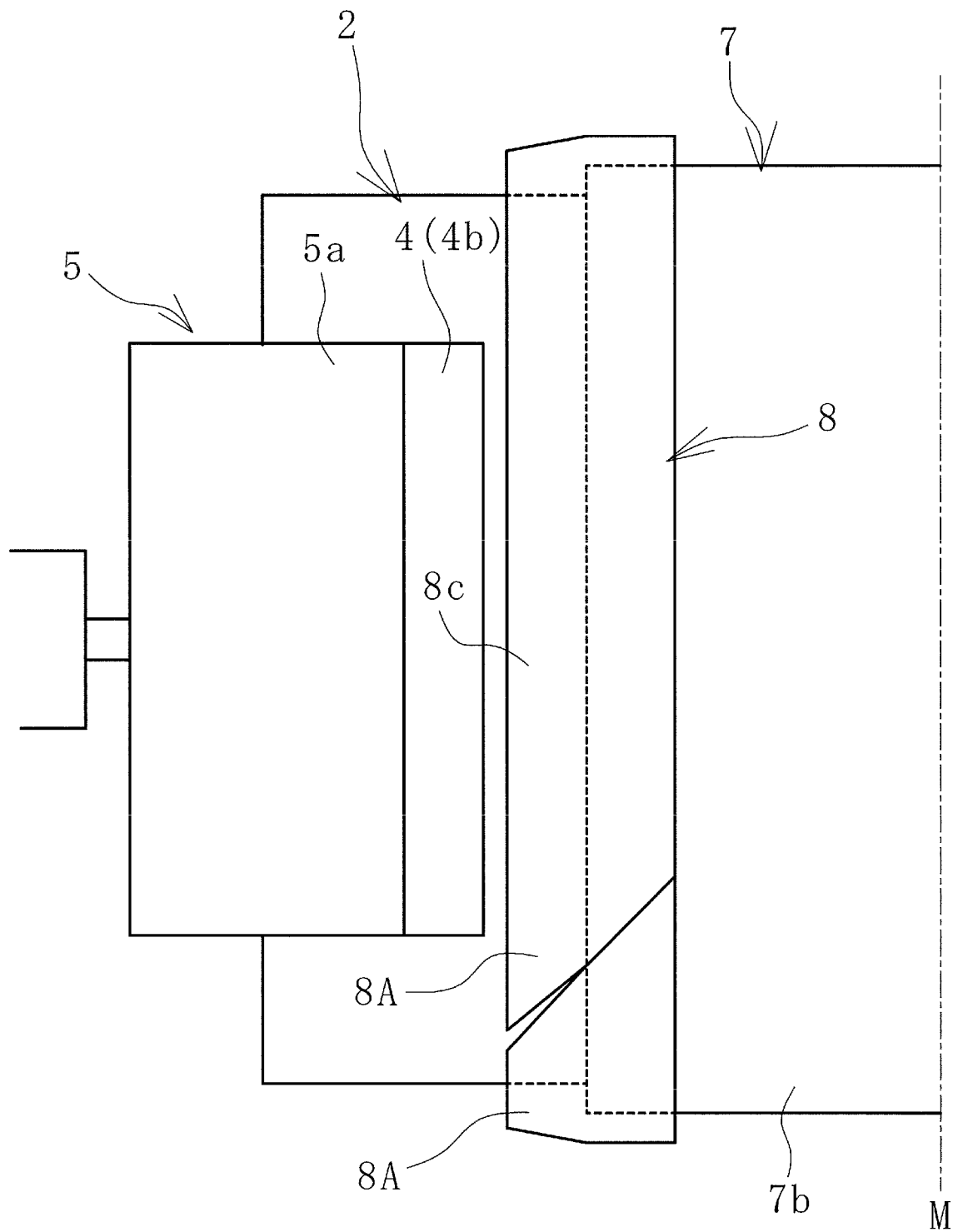
FIG. 14 is an explanatory diagram illustrating the state of FIG. 13 in a front view.

The steps of wrapping the inner circumferential side strip-shaped rubber member 7 and the outer circumferential side strip-shaped rubber members 8 around the building drum 2 to form those members into cylindrical shapes are the same as in the foregoing embodiment. In this embodiment, after the entire circumference of the outer circumferential side strip-shaped rubber member 8 is wrapped around the building drum 2, an inner circumferential surface of the support section 4 is brought into contact with the outer circumferential surface of the building drum 2, as illustrated in FIG. 13. As illustrated in FIG. 14, the support section 4 is arranged in a position offset, in the drum circumferential direction, from the boundary between the longitudinal direction end portions 8A in the projecting parts 8c.

Figure 15:
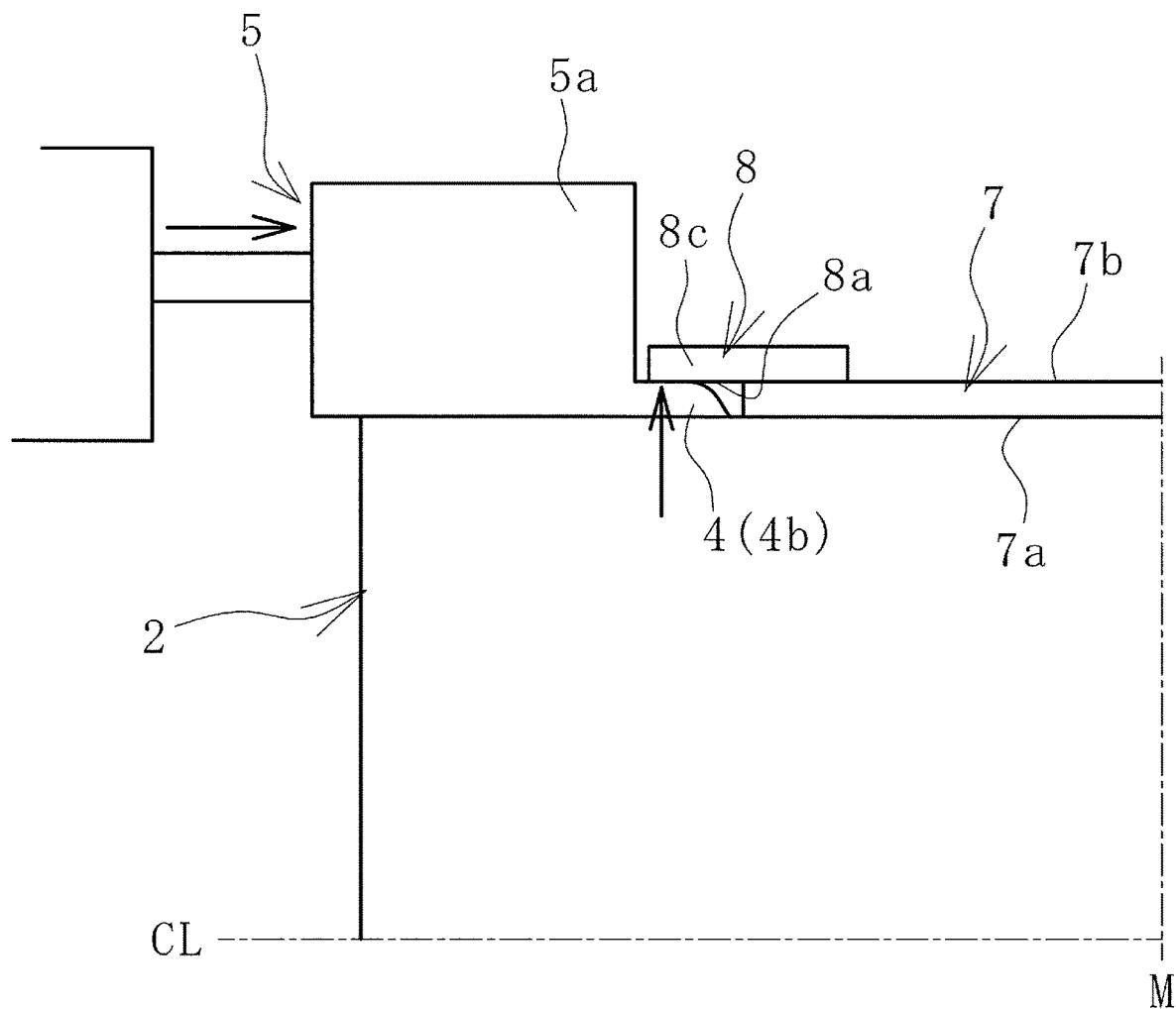
FIG. 15 is an explanatory diagram illustrating, in a side cross-sectional view, the inner circumferential surface of a projecting part of the longitudinal direction end portion of the outer circumferential side strip-shaped rubber member of FIG. 13, in a state where the inner circumferential surface is supported by a support portion.
Figure 16:
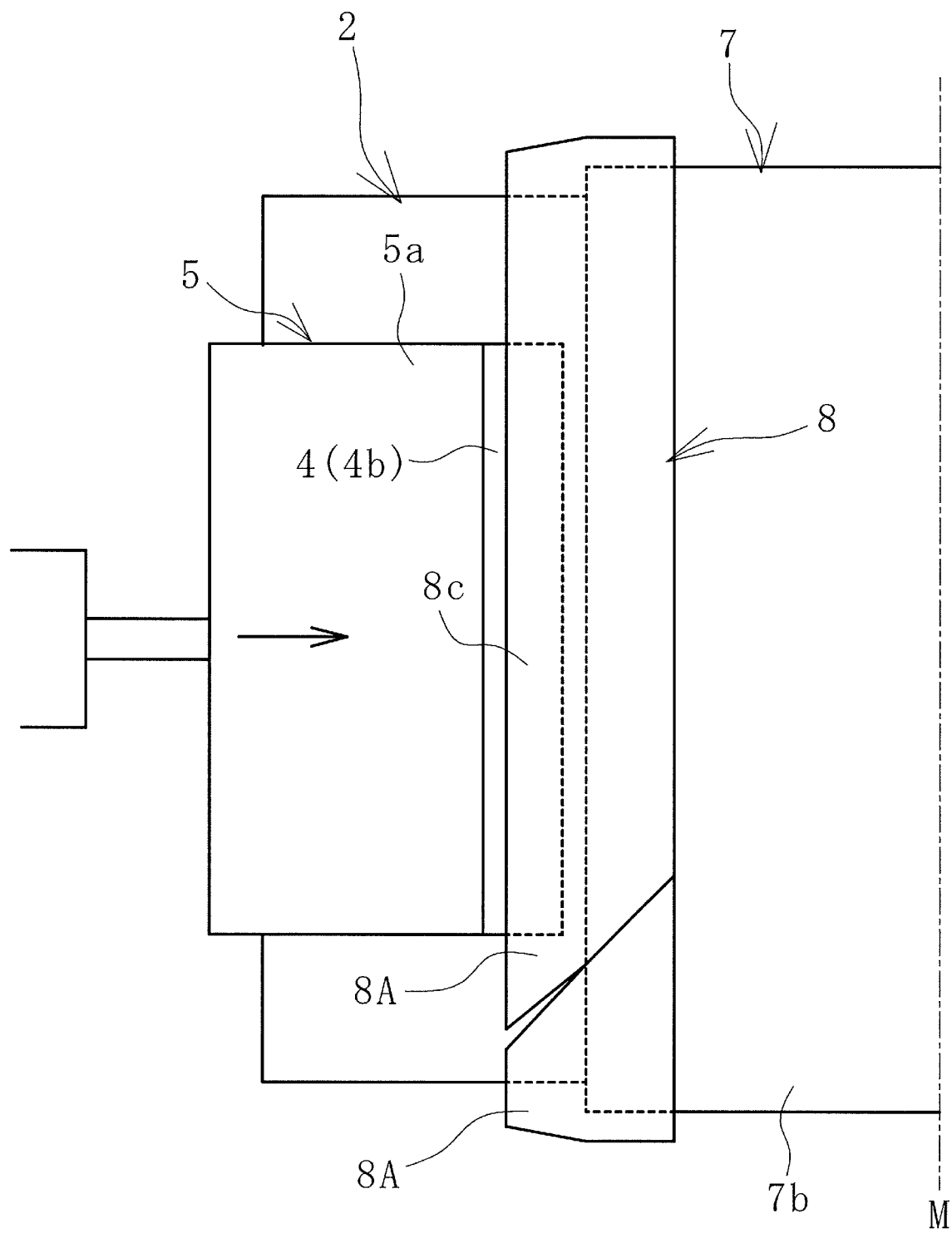
FIG. 16 is an explanatory diagram illustrating the state of FIG. 15 in a front view.

Next, in this state, the arc-shaped member 4b is moved with the pressing section 5 toward the center in the drum width direction, and the arc-shaped member 4b is inserted into the gap between the outer circumferential surface of the building drum 2 and the inner circumferential surfaces 8a of the projecting parts 8c, as illustrated in FIGS. 15 and 16. Preferably, a tip of the arc-shaped member 4b (an outer circumferential surface in the center of the drum width direction) has an arc shape, as illustrated in FIG. 13.

Although the arc-shaped member 4b can be brought into contact with a width direction end surface of the inner circumferential side strip-shaped rubber member 7 at this time, it is preferable to leave a slight gap in the drum width direction rather than making contact.

The inner circumferential surfaces 8a of the projecting parts 8c are supported as a result of the arc-shaped member 4b being inserted into the gap between the outer circumferential surface of the building drum 2 and the inner circumferential surfaces 8a of the projecting parts 8c. The inner circumferential surfaces 8a are pushed upward to the same level as the outer circumferential surface 7b of the inner circumferential side strip-shaped rubber member 7, and are positioned at that level.

Figure 17:
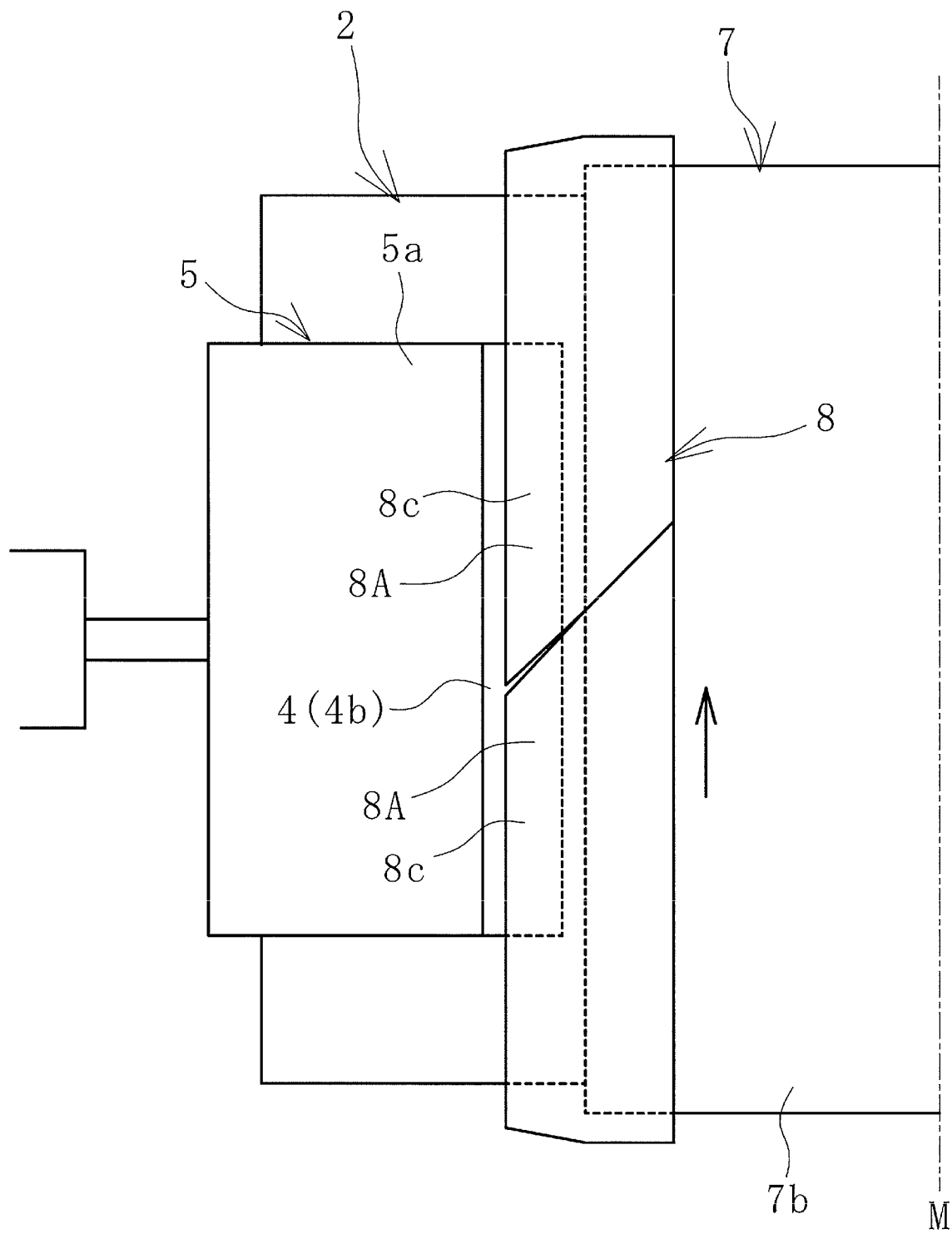
FIG. 17 is an explanatory diagram illustrating a state in which the building drum of FIG. 16 has been rotated, in a front view.

Next, the arc-shaped member 4b is moved along with the pressing section 5, relative to the building drum 2 in the circumferential direction. In this embodiment, the building drum 2 is rotated central to the support shaft 2a, and the arc-shaped member 4b is moved along with the pressing section 5 to a position spanning the boundary between the longitudinal direction end portions 8A, as illustrated in FIG. 17.

Figure 18:
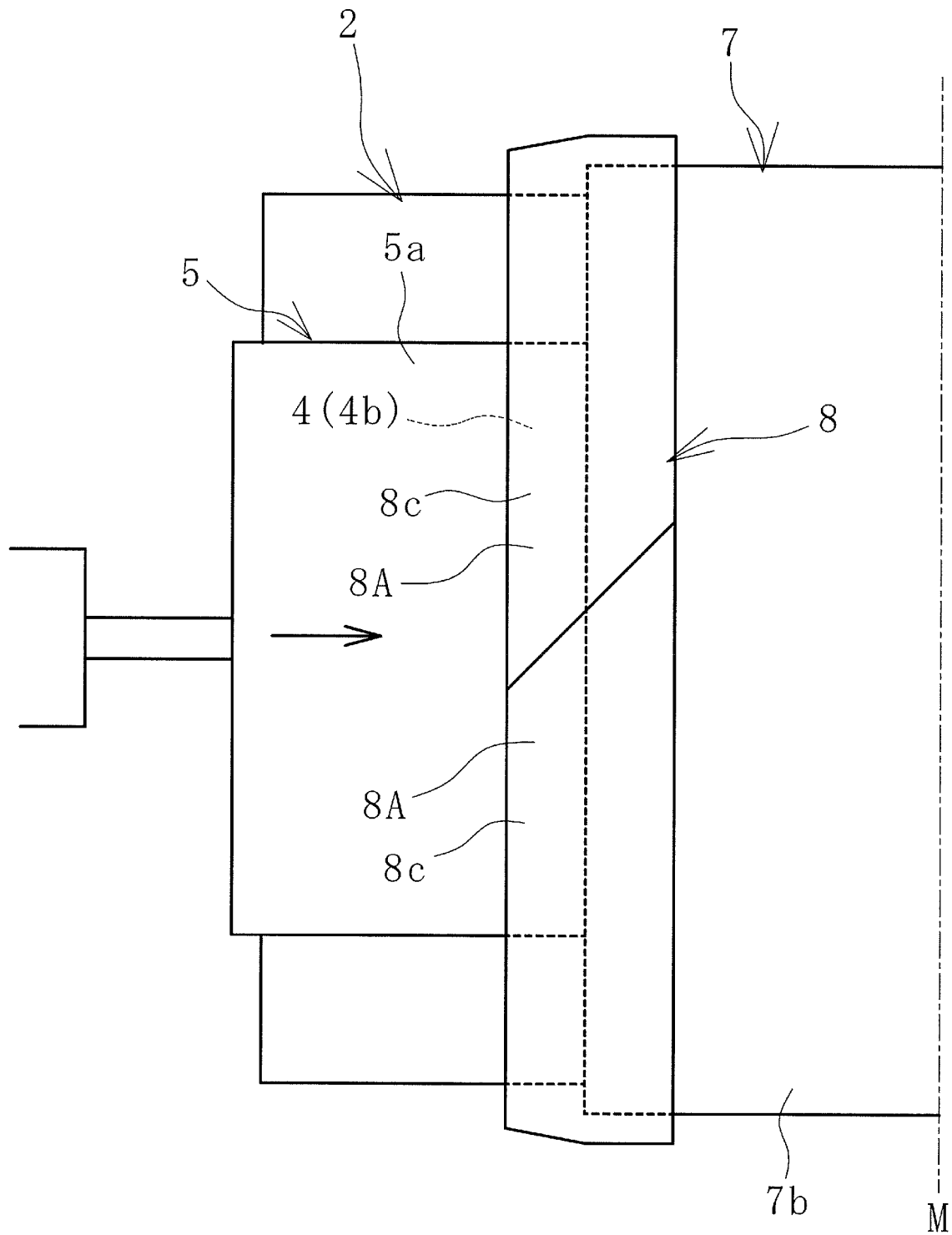
FIG. 18 is an explanatory diagram illustrating, in a front view, a state in which the projecting part of FIG. 17 is pressed in a drum width direction by a pressing portion.

Next, the pressing section 5 is moved toward the center in the drum width direction along with the arc-shaped member 4b, as illustrated in FIG. 18. The arc-shaped member 5a positioned spanning the boundary between the longitudinal direction end portions 8A presses the projecting parts 8c toward the center in the drum width direction. As a result, the projecting parts 8c of the longitudinal direction end portions 8A, between which a gap had been formed, are bonded together without a gap, and the longitudinal direction end portions 8A are bonded together across the entire ranges thereof.

The projecting parts 8c deform under their own weight more toward the boundary between the longitudinal direction end portions 8A. As such, the position where the arc-shaped member 4a is inserted in this embodiment is offset from the boundary between the longitudinal direction end portions 8A. Accordingly, the arc-shaped members 4b can be smoothly inserted into the gaps between the outer circumferential surface of the building drum 2 and the inner circumferential surfaces 8a of the projecting parts 8c. By forming the tips of the arc-shaped members 4a in arc shapes as illustrated in FIG. 15, the arc-shaped members 4a can be inserted into the gap even more smoothly.

Like the foregoing embodiment, according to this embodiment, the longitudinal direction end portions 8A can be strongly bonded together while suppressing skew in the bonding positions of the longitudinal direction end portions 8A.

In the embodiments described above, the process for bonding the longitudinal direction end portions 8A together using the support section 4 and the pressing section 5 is carried out after the outer circumferential side strip-shaped rubber members 8 have finished being wrapped around the building drum 2. After the outer circumferential side strip-shaped rubber members 8 have been wrapped around the building drum 2, the projecting parts 8c deform more as time passes. This causes a problem in that it becomes difficult to correct the deformation in the projecting parts 8c and strongly bond the longitudinal direction end portions 8A together while suppressing skew in the bonding positions thereof.

To avoid this problem, preferably, the process of bonding the longitudinal direction end portions 8A is completed at the same time as when the outer circumferential side strip-shaped rubber members 8 are finished being wrapped around the building drum 2. In other words, it is preferable to employ a configuration in which the control unit 6 carries out control such that when the outer circumferential side strip-shaped rubber members 8 have finished being wrapped around the building drum 2, the inner circumferential surfaces 8a of the projecting parts 8c are positioned at the level of the outer circumferential surface 7b of the inner circumferential side strip-shaped rubber member 7 by the support section 4, the projecting parts 8c are pressed in the drum width direction by the pressing section 5, and the process of bonding the longitudinal direction end portions 8A together is completed.

The invention claimed is:

1. A method of building a tire in which, when layering and wrapping a plurality of strip-shaped rubber members around a building drum to form a cylindrical shape, an outer circumferential side strip-shaped rubber member wrapped around a relatively outer circumferential side of the building drum is layered on an inner circumferential side strip-shaped rubber member wrapped around a relatively inner circumferential side of the building drum such that the outer circumferential side strip-shaped rubber member projects in a drum width direction, and longitudinal direction end portions of the outer circumferential side strip-shaped rubber member that are inclined relative to the drum width direction when viewed in a front view are bonded together, the method comprising:

when bonding the longitudinal direction end portions together, supporting projecting parts of the longitudinal direction end portions projecting relative to the inner circumferential side strip-shaped rubber member in the drum width direction and being free-end in a floating state by moving a support section to a supporting position which supports the inner circumferential surfaces of the projecting parts after having the outer circumferential side strip-shaped rubber member wrapped around a relatively outer circumferential side of the building drum;

positioning the inner circumferential surfaces at a level of an outer circumferential surface of the inner circumferential side strip-shaped rubber member; and pressing the projecting parts in the drum width direction to bond the longitudinal direction end portions together.

2. The method of building a tire according to claim 1, wherein the inner circumferential surfaces of the projecting parts are supported and the inner circumferential surfaces are positioned at the level of the outer circumferential surface of the inner circumferential side strip-shaped rubber member by causing part of an outer circumferential surface of the building drum to project outward as the support section in a drum radial direction.

3. The method of building a tire according to claim 2, wherein a process of bonding the longitudinal direction end portions together is completed at the same time as when the outer circumferential side strip-shaped rubber member finishes being wrapped around the building drum.

4. The method of building a tire according to claim 1, wherein the support section constituting a pressing section is inserted on an inner circumferential side of the projecting parts, the inner circumferential surfaces of the projecting parts are supported by the support section to be positioned at the level of the outer circumferential surface of the inner circumferential side strip-shaped rubber member, and in this state, the projecting parts are pressed in the drum width direction by moving the pressing section in the drum width direction.

5. The method of building a tire according to claim 4, wherein a process of bonding the longitudinal direction end portions together is completed at the same time as when the outer circumferential side strip-shaped rubber member finishes being wrapped around the building drum.

6. The method of building a tire according to claim 1, wherein a process of bonding the longitudinal direction end portions together is completed at the same time as when the outer circumferential side strip-shaped rubber member finishes being wrapped around the building drum.

* * * * *